United States Patent
Bender

(10) Patent No.: US 9,552,401 B2
(45) Date of Patent: Jan. 24, 2017

(54) ETL TOOL INTERFACE FOR REMOTE MAINFRAMES

(71) Applicant: International Business Machines Corporation, Armonk, NY (US)

(72) Inventor: Michael Bender, Rye Brook, NY (US)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 14/311,543

(22) Filed: Jun. 23, 2014

(65) Prior Publication Data

US 2015/0370871 A1    Dec. 24, 2015

(51) Int. Cl.
G06F 17/30    (2006.01)
H04L 29/08    (2006.01)

(52) U.S. Cl.
CPC ... *G06F 17/30563* (2013.01); *G06F 17/30516* (2013.01); *H04L 67/06* (2013.01)

(58) Field of Classification Search
CPC ............... G06F 17/30557; G06F 17/30563; H04L 67/06
USPC ................................. 707/600, 602
See application file for complete search history.

(56) References Cited

U.S. PATENT DOCUMENTS

| | | | |
|---|---|---|---|
| 7,720,873 B2 | 5/2010 | Loving et al. | |
| 8,176,470 B2 | 5/2012 | Klumpp et al. | |
| 2008/0079983 A1* | 4/2008 | Fowler, II | G06F 9/45512 358/1.15 |
| 2010/0198961 A1* | 8/2010 | Maromaty | G06F 9/4843 709/224 |
| 2010/0242024 A1* | 9/2010 | Gonzales, II | G06F 8/51 717/125 |
| 2012/0102007 A1* | 4/2012 | Ramasubramanian | G06F 17/30563 707/705 |
| 2013/0007707 A1 | 1/2013 | Presland | |

FOREIGN PATENT DOCUMENTS

EP    1509878 A4    10/2006
WO    2007019303 A2    2/2007

OTHER PUBLICATIONS

Bruni et al., IBM "Enterprise Data Warehousing with DB2 9 for z/OS", International Technical Support Organization, Sep. 2008, pp. 1-496, © Copyright International Business Machines Corporation 2008, <ibm.com/redbooks>.

Kooijmans et al., IBM "Batch Modernization on z/OS", International Technical Support Organization, Jul. 2012, pp. 1-488, © Copyright International Business Machines Corporation 2009, 2012, <ibm.com/redbooks>.

(Continued)

*Primary Examiner* — Hares Jami
(74) *Attorney, Agent, or Firm* — Adolph Bohnstedt

(57) ABSTRACT

Embodiments of the present invention disclose a method for remote job submission. A computer receives a first job of a job stream. If the first job accesses a mainframe operating system, then the computer retrieves at least a return code threshold for the first job from a data store. If an option to build job control language is selected for the first job, then the computer generates job control language for the first job. The computer submits the first job to a job reader on the mainframe operating system using a file transfer protocol. The computer parses a retrieved output file to determine a return code for the first job.

18 Claims, 5 Drawing Sheets

(56) References Cited

OTHER PUBLICATIONS

Owens, "MVS-JESFTP-0.03 > MVS::JESFTP", Copyright (c) 2000 Mike Owens, <http://search.cpan.org/~mikeo/MVS-JESFTP-0.03/JESFTP.pm>.
"Steps for submitting a job and automatically receiving output", z/OS V1R11.0 Communications Server IP User's Guide and Commands z/OS V1R10.0-V1R11.0 SC31-8780-09, © Copyright IBM Corporation 1990, 2010, http://pic.dhe.ibm.com/infocenter/zos/v1r11/topic/com.ibm.zos.r11.halu001/autosubmit.htm.

* cited by examiner

ETL TOOL INTERFACE FOR REMOTE MAINFRAMES

BACKGROUND OF THE INVENTION

The present invention relates generally to the field of data processing, and more particularly to a mainframe interface for an extract, transform, and load (ETL) process.

ETL (extract, transform, and load) systems facilitate extracting data from various sources, transforming the extracted data to fit operational requirements, and loading the transformed data into a data repository, such as a database at a target location. In many cases, the extracted and accumulated data is in a different format than what is needed in the target data repository. The process of acquiring this data and converting the data into useful, compatible, and accurate data is referred to as an ETL process, as in extract, transform, and load.

In an ETL process, the extract phase acquires data from the source system(s). Data extraction can be as simple as copying a flat file from a database or as sophisticated as setting up interdependencies with remote systems which supervise the transportation of source data to the target system. The extracted source data is often temporarily stored as one or more relational database tables. The transform phase in the ETL process is typically made up of several stages and includes parsing data, converting data formats, and merging extracted source data to create data in a format suitable for the data repository, or target database(s). The load phase of the ETL process includes depositing the transformed data into the new data store (e.g., the data repository, Warehouse, mart, etc.). The target database may be located on the same local computer as the data source, on a separate computer from the data source, or on a remote system, such as a mainframe computer.

Mainframe computers process large amounts of data, such as census information, industry and consumer statistics, and financial transactions. Current mainframe computers are defined by the redundancy of their internal design, extensive throughput capabilities, and backward compatibility with older software. Mainframe computers utilize proprietary operating systems for running applications, such as data processing. The operating system of a mainframe computer may include an interface for file transfer protocol (FTP) functions. FTP is a part of a standard transmission control protocol (TCP) used to transfer data sets and files between a client host computer and a remote host server computer running an FTP server application over a network. FTP users may authenticate with a username and password, or connect anonymously depending on the mainframe server configuration.

SUMMARY

Embodiments of the present invention disclose a method for remote job submission. Responsive to determining that a first job of a job stream accesses a mainframe operating system, a computer retrieves at least a return code threshold for the first job from a data store. Responsive to determining that an option to build job control language is selected for the first job, the computer generates job control language for the first job. The computer submits the first job to a job reader on the mainframe operating system using a file transfer protocol. The computer parses a retrieved output file of job results to determine a return code for the first job.

DETAILED DESCRIPTION

Figure 1:
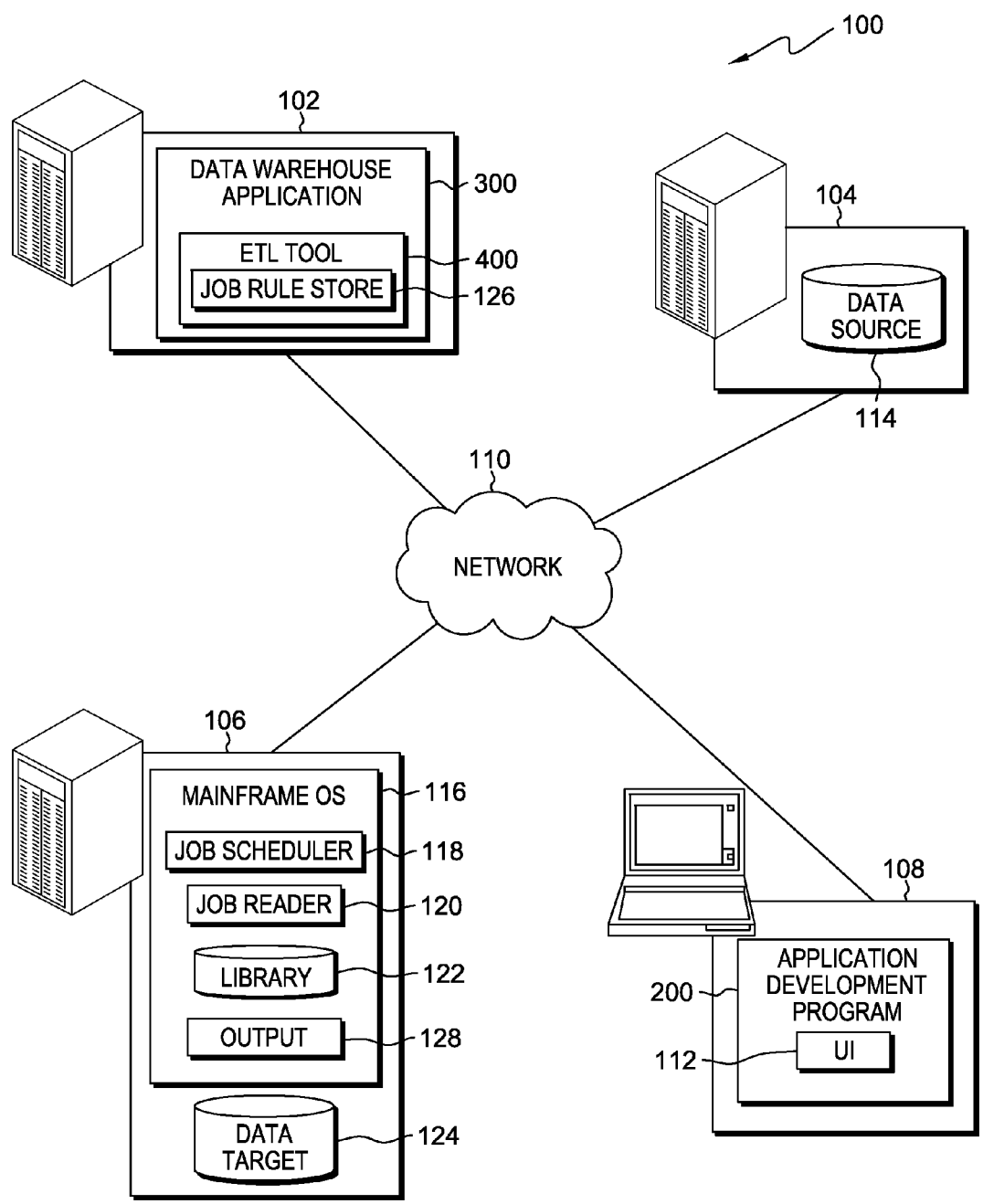
FIG. 1 is a functional block diagram illustrating a distributed data processing environment, in accordance with an embodiment of the present invention.

Mainframe computers utilize proprietary operating systems, which do not easily interface with data processing applications running on the operating systems of other server computers. Mainframe operating systems may use scripting languages, such as a job control language (JCL), to describe a job stream as a series of jobs performed by the computer in a particular order. Each job may comprise one or more data processing steps or tasks for execution in a distributed data environment that are saved in a job file. The series of commands in a job file may specify the input data sets to be accessed, the output data set to be created or updated, the resources to be allocated for the job, and the programs to be run, using these input and output data sets. A job file may be started or triggered directly by an administrator, or may be scheduled. Mainframe operating systems may schedule a job file through a job control subsystem that includes components to receive jobs, schedule jobs for processing, and control any associated output processing. Mainframe computers may retrieve or receive job files via file transfer protocol (FTP) functions within the mainframe operating system.

Data warehouse applications use an extract, transform, and load (ETL) tool to extract data from a source database on a server computer, transform the extracted data for insertion into a target database, and then subsequently load the transformed data into a remote database, such as on a mainframe computer via a network. An embodiment, in accordance with the present invention, recognizes that ETL tools in data warehouse applications do not interface efficiently with the proprietary operating systems of mainframe computers due to differences in technology. In accordance with the present disclosure, embodiments provide for a data warehouse application comprising an ETL tool with a programmed interface for remote job submission to a mainframe computer. The programmed interface provides capabilities including, but not limited to: building a job file based on stored rules, submitting the job file to a job reader on a mainframe computer via FTP, monitoring the job for completion, retrieving and parsing the output file of job results, and based on the job completion status, determining if a job stream continues to the next job.

An embodiment, in accordance with the present invention, recognizes that automation of the job building and remote job submission process will free up time for ETL programmers and database administrators, and that scheduling database utilities based on the interim job results within a job stream will increase efficiencies associated with valuable computing resources.

Embodiments may apply to all database types, including but not limited to relational, hierarchical, network, and object-oriented databases. Specific details disclosed herein are not to be interpreted as limiting, but merely as a representative basis for teaching one skilled in the art to variously employ the methods and structures of the present disclosure.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computers 102 and 104, mainframe computer 106, and client computer 108, interconnected over network 110. Distributed data processing environment 100 may include additional server computers, client computers, or other devices not shown.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computers 102 and 104, mainframe computer 106, and client computer 108, in accordance with an embodiment of the present invention.

Server computers 102 and 104 can each respectively be a server computer, an application server, a laptop computer, a tablet computer, a netbook computer, a personal computer (PC), a desktop computer, a personal digital assistant (PDA), a smart phone, or any programmable electronic device capable of communicating with mainframe computer 106, client computer 108, and each other via network 110. In certain embodiments, server computers 102 and 104 can each respectively represent a computer system utilizing clustered computers and components that act as a single pool of seamless resources when accessed through network 110, as is common in data centers and with cloud computing applications. Server computers 102 and 104 may each be a node in a distributed database management environment. In general, server computers 102 and 104 can each respectively be representative of any computing device or a combination of devices with respective access to data warehouse application 300, ETL tool 400, job rule store 126, and data source 114, and sever computer 102 is capable of executing data warehouse application 300 and ETL tool 400. Server computers 102 and 104 may each include internal and external hardware components, as depicted and described in further detail with respect to FIG. 5.

Server computer 102 includes an instance of data warehouse application 300. In the depicted environment, data warehouse application 300 is a customizable ETL application to extract data from data source 114, transform the extracted data to meet requirements of data target 124, and load the transformed data into data target 124. Data warehouse application 300 may perform other tasks such as create and publish a report from the updated database after the initial ETL task is finished. Data warehouse application 300 includes a job stream. A job stream is a sequence of operational steps or tasks, such as performing an ETL task and then running a report. A developer using an integrated development environment (IDE), which facilities programming the logic of data processing tasks, builds data warehouse application 300 using application development program 200 on client computer 108. In other embodiments, data warehouse application 300 and data source 114 may be on one computer, or more than one computer, and each item itself may be split into a plurality of parts or modules and spread across more than one computer. An example of a job stream within data warehouse application 300 is described further in FIG. 3.

Server computer 102 includes an instance of ETL tool 400. ETL tool 400 may include middleware that allows a developer to specify the requirements for performing ETL (extract, transform, and load) tasks between customized data-related applications. ETL tool 400 provides an application programming interface (API) that enable custom applications to connect to databases and issue commands for manipulating databases saving a developer from having to write complex ETL code. In an embodiment, ETL tool 400 provides an interface, which enables data warehouse application 300 to create a job stream in the job control language associated with mainframe OS 116, such that the job stream is executable on mainframe computer 106. ETL tool 400, waits for the output of the job stream, retrieves the output file, parses out the return code, and compares the return code to a threshold value to determine the next processing step. ETL tool 400 may be fully integrated with, partially integrated with, or be completely separate from data warehouse application 300. ETL tool 400 is described further in FIG. 4.

Server computer 102 includes an instance of job rule store 126. Job rule store 126 is a data store within ETL tool 400 providing storage for parameters used in configuring the interface between data warehouse application 300 on server computer 102, and mainframe OS 116 on mainframe computer 106. In one embodiment, job rule store 126 comprises a list of parameters for remote job submission, including one or more of: a target computer operating system type, a host internet protocol (IP) address or domain name system (DNS) server name related to mainframe computer 106, a userid and password for mainframe computer 106, a userid and password for the FTP server, an output class for job results, an output wait time, a return code threshold, a job file location, and a job file name. In another embodiment, job rule store 126 additionally comprises parameters related to database access of data target 124, such as a userid, a password, field names, table names, a database location, and an operating system for the computer on which the database resides. In some embodiments, job rule store 126 organizes parameters by job file name for each job of a job stream. In other embodiments, job rule store 126 organizes parameters by operating system type. The parameters enable remote job submission by server computer 102 to mainframe computer 106 via FTP over network 110. Job rule store 126 may be fully integrated with, partially integrated with, or be completely separate from ETL tool 400.

Server computer 104 includes an instance of data source 114. Data source 114 may include one or more of the following: a relational database, flat files, comma-separated text, a non-relational database, hierarchical databases, or other data structures such as Virtual Storage Access Method (VSAM), and Indexed Sequential Access Method (ISAM). In one embodiment, data warehouse application 300 may collect data from various sources (not all shown), such as data source 114 on server computer 104, each with differing formats of data organization, and which are transformed into a single format appropriate for validation processing and loading into data target 124. In another embodiment, data warehouse application 300 may collect data from a database table on mainframe computer 106, and then load the transformed data into data source 114 on server computer 104. One skilled in the art will recognize that there may be many other types of data sources available for use by ETL tools.

Mainframe computer 106 is typically a mainframe computer, but may also be a personal computer, a laptop computer, a workstation computer, or any programmable electronic device capable of operating with a mainframe operating system, such as mainframe OS 116, or a mainframe operating system emulator. Mainframe computer 106 may act as a server computer, or an application server, and is capable of communicating with server computers 102 and 104, and client computer 108 via network 110. In certain embodiments, mainframe computer 106 can represent a computer system utilizing clustered computers and components that act as a single pool of seamless resources when accessed through network 110, as is common in data centers and with cloud computing applications. Mainframe computer 106 may be a node in a distributed database management environment. In general, mainframe computer 106 can be representative of any computing device or a combination of devices with access to mainframe OS 116, job scheduler 118, job reader 120, library 122, data target 124, and output 128, and is capable of executing mainframe OS 116, job scheduler 118, and job reader 120. Mainframe computer 106 may include internal and external hardware components, as depicted and described in further detail with respect to FIG. 5.

Mainframe computer 106 includes an instance of a mainframe operating system, or mainframe OS 116. In accordance with an embodiment of the present invention, mainframe OS 116 supports remote job triggering via FTP. One skilled in the art will recognize that there may be other communication protocols used to submit and trigger jobs remotely other than FTP. The illustrative embodiments of the Figures employ FTP for remote job triggering, but are not intended to be limiting of the invention. In an alternate embodiment, the mainframe operating system may be an emulator program running on a non-mainframe computer (not shown).

Mainframe computer 106 includes an instance of each of job scheduler 118 and job reader 120 within mainframe OS 116. Job scheduler 118 and job reader 120 are each components of a batch processing subsystem, or spooler, of mainframe OS 116 which is responsible for receiving jobs into the operating system, scheduling the jobs for processing, and controlling the job output processing. Job reader 120 is a component that receives a job submitted from an outside application, or other source, via FTP, and submits the received job to job scheduler 118 for execution. Job scheduler 118 schedules the job for processing by placing the job file into an input queue. Job scheduler 118 manages the priority of each job in the input queue, the resources for the job, and the associated input data and output results for each job. Both job reader 120 and job scheduler 118 may respectively be fully integrated with, partially integrated with, or be completely separate from mainframe OS 116.

Mainframe computer 106 includes an instance of library 122 within mainframe OS 116. Library 122 stores customized program code for use by mainframe OS 116. Code may be stored as a text file, or other forms of a flat file. Library 122 may contain procedures, or a list of pre-written JCL steps, which may be inserted into a job as requested. Library 122 may contain whole jobs, pre-written in JCL, for executing routine tasks, such as monthly reports, which may be inserted into a job as requested. In an embodiment, the job stream of data warehouse application 300 may request a stored job to be run, which is enabled by ETL tool 400 retrieving the stored job from library 122, and submitting the stored job to job reader 120 via FTP. Job reader 120 then submits the stored job to job scheduler 118. Library 122 may be fully integrated with, partially integrated with, or be completely separate from mainframe OS 116.

Mainframe computer 106 includes an instance of output 128 within mainframe OS 116. Output 128 may be an output queue or hold queue comprising a collection of output files for each job run on mainframe computer 106. After a job executes, mainframe OS 116 logs any resulting output in a file with a name related to the job file name, and places the output file in output 128. The output file contains a return code indicating the status of the job completion, such as clean, warning, or abnormal ending ("abend"). ETL tool 400, waits for the output, retrieves the output file, parses out the return code, and compares the return code to a threshold value to determine the next processing step. Output 128 may be fully integrated with, partially integrated with, or be completely separate from mainframe OS 116.

Mainframe computer 106 includes an instance of data target 124. In the illustrative embodiment of FIG. 1, data target 124 is a relational database with tables used as a data warehouse. In an embodiment, data warehouse application 300 on server computer 102 loads the transformed data extracted from data source 114 of server computer 104 into data target 124 on mainframe computer 106 via network 110 utilizing ETL tool 400. In an alternate embodiment, data warehouse application 300 may extract data from data target 124 for loading onto a database on server computer 104.

In various embodiments, client computer 108 can be a laptop computer, a tablet computer, an application server, a netbook computer, a personal computer (PC), a desktop computer, a personal digital assistant (PDA), a smartphone, or any programmable electronic device capable of communicating with server computers 102 and 104, and mainframe computer 106, via network 110. In general, client computer 108 can be representative of any computing device or a combination of devices with access to application development program 200, and is capable of executing application development program 200. Client computer 108 may include internal and external hardware components, as depicted and described in further detail with respect to FIG. 5.

Client computer 108 includes an instance of application development program 200, which may execute locally on the respective client computer and has the capability to create or update data warehouse application 300 on server computer 102 via network 110. Application development program 200 integrates data across multiple systems using a high performance parallel framework, and supports extended metadata management and enterprise connectivity. Application development program 200 supports integration of data at rest or in motion on both distributed and mainframe platforms.

Application development program 200 may be a suite of applications including, but not limited to, business intelligence tools, database management tools, metadata management and retrieval tools, reporting tools, and analysis tools used by business professionals for data mining, online analytical processing, and market research. In some embodiments, application development program 200 may be an associated client application created by the vendor or developer of ETL tool 400 for use in a server-client environment. Application development program 200 may use a graphical notation to construct data integration solutions with individual icons for data source 114, data target 124, and the query that relates them. In the depicted environment, application development program 200 uses a user interface, such as UI 112, to receive user input, and to output responses to a user. In the depicted environment, application development program 200 is an application allowing authorized users, such as database developers and architects, to create custom ETL applications, such as data warehouse application 300, using ETL tool 400 for data integration against a central repository of data on a server, such as data target 124 on mainframe computer 106. Application development program 200 is described further in FIG. 2.

In other embodiments, data warehouse application 300, application development program 200, ETL tool 400, and data source 114 may be on one computer.

Client computer 108 includes an instance of a user interface, UI 112, within application development program 200, which may utilize a web page application, a command line processor, or any other graphical user interface (GUI). UI 112 includes components used to receive input from a user and transmit the input to application development program 200 residing on the respective client computer. In an embodiment, UI 112 uses a combination of technologies and devices, such as device drivers, to provide a platform to enable users of client computer 108 to interact with application development program 200. In the exemplary embodiment, UI 112 receives input, such as dragging and dropping data icons onto a workspace using a physical input device, such as a keyboard or mouse, via a device driver that corresponds to the physical input device.

In the illustrative embodiment, application development program 200 residing on client computer 108 allows a developer to create or customize data warehouse application 300 on server computer 102 via network 110. Application development program 200 allows the developer to configure data warehouse application 300 with a job stream for ETL processing. In accordance with various embodiments of the present invention, a job stream is a sequence of processing tasks or jobs, written in a job control language (JCL) or other batch job scripting language, which may be proprietary to a specific operating system, such as mainframe OS 116. Each job consists of a statement defining the executable program or code, and a list of resources, such as data files and devices for use. The job stream is stored as data warehouse application 300 on server computer 102. Independent of the operating system, the job stream may include information regarding data source 114, transformation queries or commands, and data target 124 used for each ETL task within the job stream. Application development program 200 requests from the developer the database location information, and validation credentials for both data source 114 and data target 124, to be stored in data warehouse application 300 as needed for running the tasks of the job stream. When defining data source 114 and data target 124, the developer selects the operating system type for each. The selection of operating system allows ETL tool 400 to determine the method for submitting each job in the job stream to the target computer, such as mainframe computer 106. Along with jobs for ETL steps in the job stream, application development program 200 allows the developer to insert one or more stored jobs from library 122 on mainframe computer 106 into the job stream for pre-defined tasks such as starting a database utility, or requesting a report incorporating the recently loaded data within data target 124. In one embodiment, the developer builds an ETL job stream for doing a bulk database load. In other embodiments, the developer builds a job stream that does not perform ETL tasks or a bulk database load, and only runs one or more stored jobs, such as a report. In another embodiment, the developer builds a job stream with any combination of job types.

In the illustrative embodiment, ETL tool 400 on server computer 102 includes job rule store 126, which enables remote job submission on mainframe computer 106. Job rule store 126 comprises a list of parameters for remote job submission, including one or more of: a target computer operating system type, a host IP address or DNS server name related to mainframe computer 106, a userid and password for mainframe computer 106, a userid and password for the FTP server, an output class for job results, an output wait time, a return code threshold, a job file location, and a job file name. In one embodiment, job rule store 126 organizes parameters by job file name for each job of a job stream. In another embodiment, job rule store 126 organizes parameters by operating system type. Application development program 200 enables the developer to configure parameters for each job, each operating system type, or each target database, and store the configured parameters in job rule store 126 on server computer 102 when customizing data warehouse application 300. In an embodiment, job rule store 126 additionally comprises database metadata for data target 124. One skilled in the art will recognize that there may be other ways to organize parameters in job rule store 126.

In the illustrative embodiment, upon execution of data warehouse application 300 on server computer 102, if data target 124 is on a mainframe computer, such as mainframe computer 106, then ETL tool 400 provides an interface for mainframe OS 116, which enables the submission of each job in the job stream of data warehouse application 300. ETL tool 400 determines if the job already exists pre-written in the JCL, and stored in either library 122 on mainframe computer 106, or in ETL tool 400 on server computer 102. Responsive to determining that the job already exists pre-written in the JCL, ETL tool 400 issues an FTP get command to retrieve the job file from the respective location. Responsive to determining that the job does not exist pre-written in the JCL, ETL tool 400 builds the job file dynamically in JCL utilizing parameters stored in job rule store 126. ETL tool 400 submits the job file to job reader 120 on mainframe computer 106 via FTP. Job reader 120 submits the job file to job scheduler 118, which triggers the job to start. Mainframe computer 106 executes the job within mainframe OS 116.

In the illustrative embodiment, ETL tool 400 monitors each job of the job stream for completion. ETL tool 400 retrieves the wait time and a return code threshold for a job or an operating system type from job rule store 126. For example, a job return code may be a two-digit code, such as 00, 04, 08, etc., where a return code of 00 means the job completed without any errors, and a return code of 08 means the job failed before completion. After waiting the wait time associated with the current job, ETL tool 400 retrieves the job output file from the job log or hold queue of output 128 on mainframe computer 106 via network 110. ETL tool 400 parses the retrieved job output file to determine the return code associated with the completion status of the job. ETL tool 400 determines based, at least in part, on a comparison of the return code to the retrieved return code threshold for a job, whether the job stream continues to the next job or task of the job stream, or aborts execution of the job stream.

In one embodiment, ETL tool 400 interprets the return code threshold as a maximum. If the return code from the job output is below the return code threshold, then ETL tool 400 continues to the next job in the job stream. If the return code from the job output is equal to or above the return code threshold for the job, then ETL tool 400 aborts execution of the job stream. An error message regarding the reason for aborting the job stream, including the job file name and the job return code, may be sent to the database administrator, or be included in an error log.

In an alternate embodiment, ETL tool 400 interprets the return code threshold as a minimum. If the return code from the job output is above the return code threshold, then ETL tool 400 continues to the next job in the job stream. If the return code from the job output is equal to or below the return code threshold for the job, then ETL tool 400 aborts execution of the job stream. An error message regarding the reason for aborting the job stream, including the job file name and the job return code, may be sent to the database administrator, or be included in an error log. One skilled in the art will recognize that ETL tool 400 may compare the return code threshold to the return code from the job output using variations of the above determinations.

Figure 2:
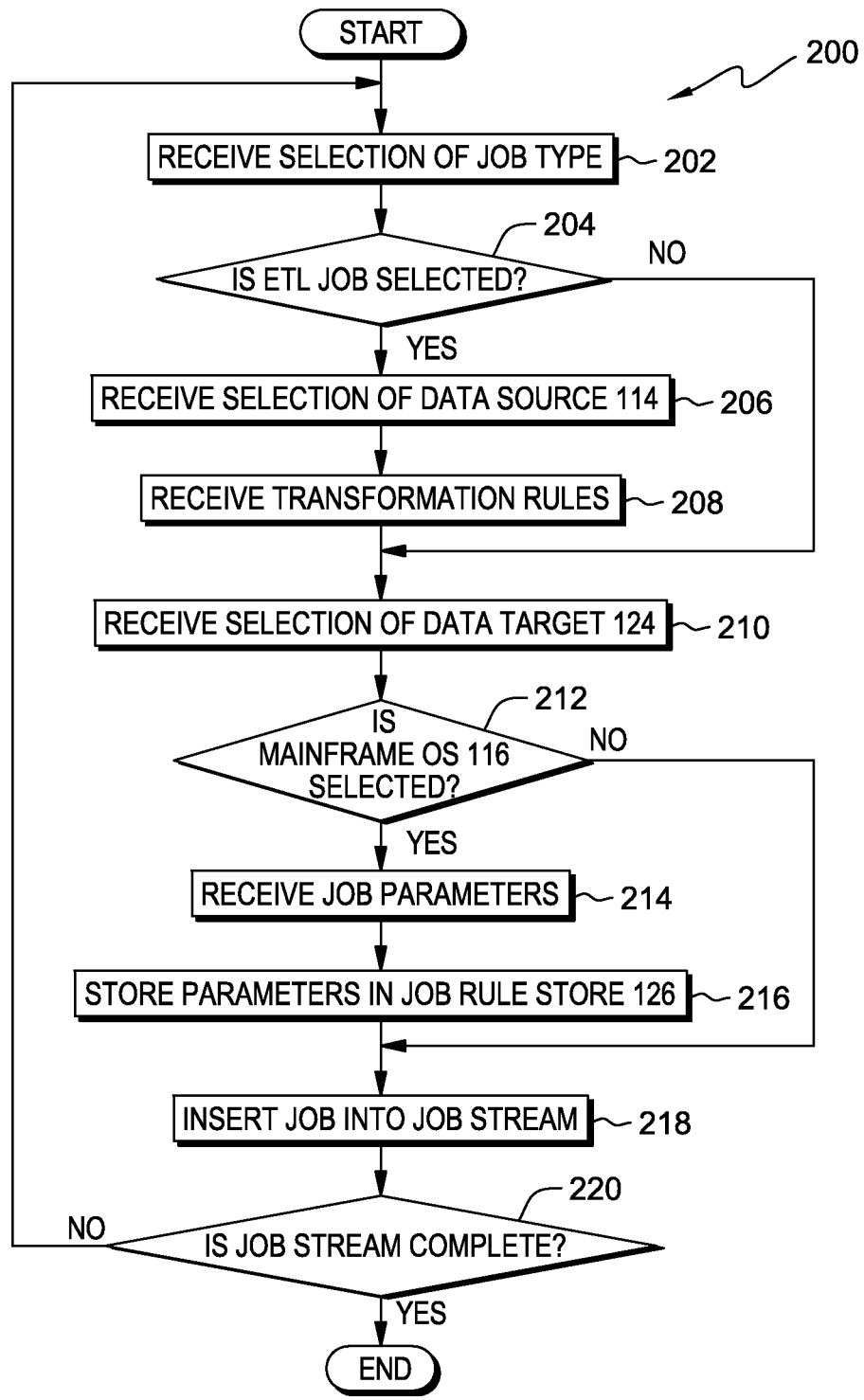
FIG. 2 is a flowchart depicting the operational steps of an application developer for creating an ETL application with the ability to submit jobs remotely, in accordance with an embodiment of the present invention.

FIG. 2 is a flowchart depicting the operational steps of an application developer for creating an ETL application with the ability to submit jobs remotely, in accordance with an embodiment of the present invention. In the illustrative embodiment, application development program 200 running on client computer 108 allows a user to create data warehouse application 300 on server computer 102 via network 110. Data warehouse application 300 may include a list of several jobs within a job stream. The depicted flow adds a job to a job stream, and may be repeated to create a complete job stream for data warehouse application 300. Each added job may be comprised of one or more tasks or jobs, as in a batch process.

Application development program 200 receives a selection of job type (step 202). Application development program 200 provides a user interface, UI 112, which allows a user, such as a database developer or architect, to select a job type of a job to be added to the job stream of data warehouse application 300. Application development program 200 may request the user to select a specific job type, or to select a category of jobs, such as ETL jobs, and non-ETL jobs.

Application development program 200 determines if an ETL job is selected (decision block 204). If application development program 200 determines that an ETL job is not selected (no branch, decision block 204), then application development program 200 receives a selection of data target 124 (step 210). If application development program 200 determines that an ETL job is selected (yes branch, decision block 204), then application development program 200 receives a selection of data source 114 (step 206). When defining ETL jobs, data source 114 and the transformation rules are defined in the subsequent steps. When defining non-ETL jobs of a job stream, such as a report or utility, data source 114 and ETL transformation rules may not be required, and therefore steps 202 and 204 may be skipped.

Application development program 200 receives a selection of data source 114 (step 206). Application development program 200 provides a user interface, UI 112, which allows a user, such as a database developer or architect, to define data source 114. As noted in FIG. 1, data source 114 may be one or more databases or flat files on one or more computers. For example, application development program 200 allows the user to define the criteria for extracting data from data source 114 including, but not limited to, defining source tables and filter criteria, SQL commands, how to parse the data, and verification of initial structure. Application development program 200 receives the database location information, and validation credentials for data source 114, to be stored in data warehouse application 300 as needed for running the tasks of the job stream.

Application development program 200 receives transformation rules (step 208). Application development program 200 allows the user to define one or more transformation rules, such as queries or SQL commands, to transform the extracted data. Application development program 200 allows the user to define the criteria for transforming the extracted data including, but not limited to, parsing the data, cleaning the data, applying a series of rules or functions to the extracted data, checking data integrity, and creating aggregates or disaggregates of the extracted data.

Application development program 200 receives a selection of data target 124 (step 210). Application development program 200 allows the user to define data target 124. For example, application development program 200 allows the user to define the criteria of an ETL job for loading data into data target 124 including, but not limited to, staging data before loading, defining target source tables and selection criteria, defining criteria for audit tables, and defining overwrite/update criteria. If application development program 200 arrived at step 210 directly from decision block 204, then application development program 200 enables the user to define a non-ETL job. When defining non-ETL jobs for a job stream, such as a report or a utility, application development program 200 defines data target 124 as one or more databases utilized in the report or utility. Application development program 200 receives the database location information, and validation credentials for data target 124, to be stored in data warehouse application 300 as needed for running the tasks of the job stream. Application development program 200 requests and receives a selection for the operating system of data target 124. In one embodiment, application development program 200 may divide the operating system selections between mainframe operating systems, such as mainframe OS 116, and other operating systems. Application development program 200 may request the user to select the specific operating system, or a generic operating system type.

Application development program 200 determines if mainframe OS 116 is selected (decision block 212). If application development program 200 determines that mainframe OS 116 is not selected (no branch, decision block 212), then application development program 200 inserts job into job stream (step 218).

If application development program 200 determines that mainframe OS 116 is selected (yes branch, decision block 212), then application development program 200 receives job parameters (step 214). When the user selects mainframe OS 116, application development program 200 may offer dynamic selections to the user through a graphical user interface, such as UI 112, allowing the user to specify the job parameters in various ways. In one embodiment, the selections may be displayed graphically using checkboxes or a pull-down menu within a tab or box for job stream criteria. The received job parameters enables remote job submission on mainframe computer 106 by ETL tool 400. Job rule store 126 comprises a list of parameters for remote job submission, including one or more of: a target computer operating system type, a host IP address or DNS server name related to mainframe computer 106, a userid and password for mainframe computer 106, a userid and password for the FTP server, an output class for job results, an output wait time, a return code threshold, a job file location, and a job file name. In the illustrative embodiment of FIG. 2, job rule store 126 organizes parameters by job for each job of a job stream. In other embodiments, job rule store 126 organizes parameters by operating system type. In various embodiments, job rule store 126 additionally comprises parameters related to database metadata for data target 124. During development of data warehouse application 300 using application development program 200, an option to build the JCL for each job may be selected by the developer, and stored in job rule store 126, within ETL tool 400, or within the code of data warehouse application 300.

Application development program 200 stores parameters into job rule store 126 (step 216). In the illustrative embodiment of FIG. 2, application development program 200 enables the developer to configure parameters for each job, and store the configured parameters (from step 214) in job rule store 126 in ETL tool 400 on server computer 102 when customizing data warehouse application 300.

Application development program 200 inserts job into job stream (step 218). Application development program 200 inserts the ETL task (defined by steps 202, 204, and 206), or the non-ETL task (defined in step 206) to the job stream of data warehouse application 300. For example, a non-ETL task includes a utility or report available from stored jobs residing in library 122 on mainframe computer 106.

Application development program 200 determines if job stream is complete (decision block 220). If application development program 200 determines that the job stream is complete (yes branch, decision block 220), then application development program 200 ends. If application development program 200 determines that the job stream is not complete (no branch, decision block 220), then application development program 200 receives a selection of job type (step 202). In one case, if the user is not finished, then the steps listed above may be repeated as needed to create a job stream of two or more jobs for data warehouse application 300. An example of a multiple step job stream is detailed in FIG. 3. After all jobs of the job stream are entered, application development program 200 stores the finished application on server computer 102. For example, application development program 200 saves data warehouse application 300 on server computer 102 via network 110.

Figure 3:
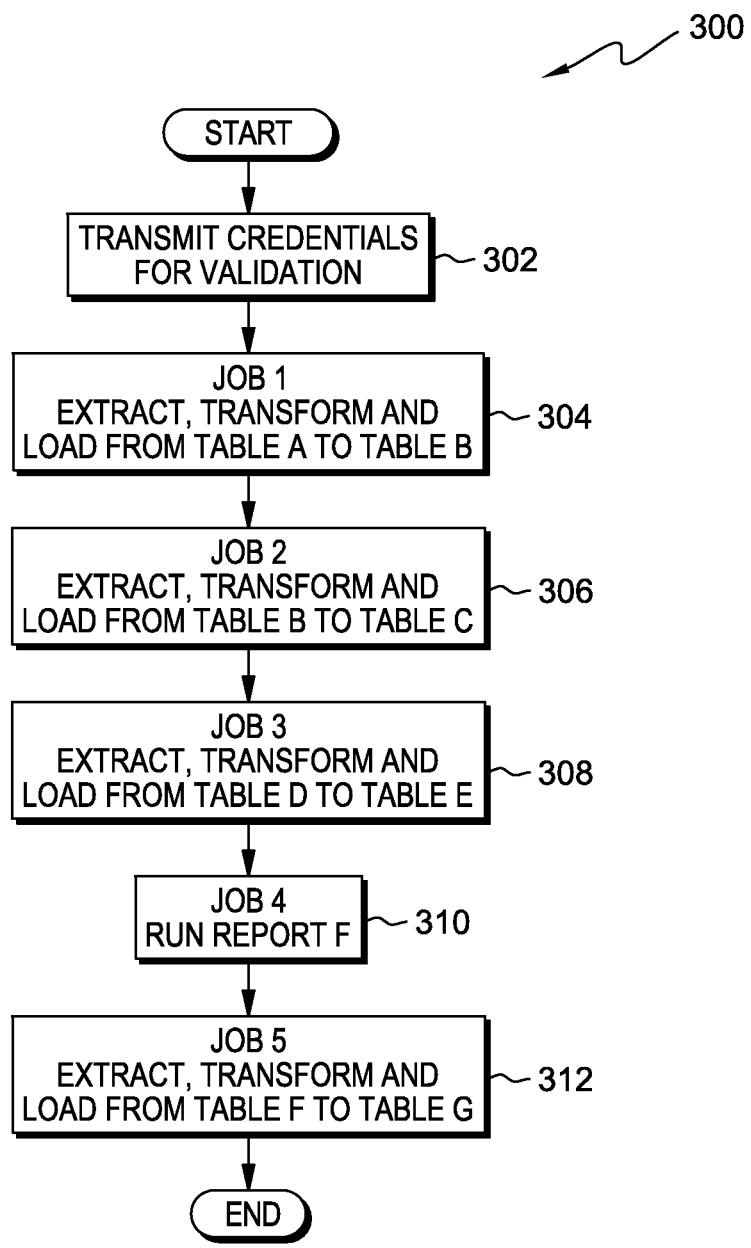
FIG. 3 is a flowchart depicting an example of the operational steps of a data warehouse application for the purpose of showing a multiple step job stream, in accordance with an embodiment of the present invention.

FIG. 3 is a flowchart depicting an example of the operational steps of data warehouse application 300 for the purpose of showing a multiple step job stream, in accordance with an embodiment of the present invention. Data warehouse application 300 is a custom application which extracts data from data source 114, transforms the extracted data to meet requirements of data target 124, and loads the transformed data into data target 124. In the illustrative example, data warehouse application 300 performs three ETL jobs in a row followed by a report job. The flow depicted in FIG. 3 is merely an illustration, and should not be limiting in the number of possible steps and types of steps within a job stream for a data-related application.

Data warehouse application 300 transmits credentials for validation (step 302). In an embodiment, data warehouse application 300 sends the application credentials at the start of the job stream to the database management system (DBMS) of data target 124 to validate that the userid has the authority to retrieve data from data source 114 and to load data on data target 124. Responsive to a determination that the application credentials have authority, data warehouse application 300 loads the transformed data into data target 124. If the userid does not have the proper authority, the ETL job aborts. In an alternate embodiment, this validation may be done prior to each load step of one or more ETL jobs within a job stream. ETL tool 400 may be an integrated part of data warehouse application 300 and provides the database connections, and ability to issue commands to perform the three ETL jobs, and the report job.

Data warehouse application 300 performs job 1 to extract, transform, and load data from table A to table B (step 304). Table A is a table or flat file within data source 114, and table B is a table within data target 124. The details of the ETL task were configured by the user using application development program 200, as shown in FIG. 2. During development of data warehouse application 300 using application development program 200, selections were made indicating that data source 114 is on a non-mainframe operating system, and data target 124 is on a mainframe operating system.

ETL tool 400 retrieves the wait time and return code threshold for job 1 from job rule store 126. After waiting the wait time associated with job 1, ETL tool 400 retrieves the job output file from the job log of output 128 on mainframe computer 106 via network 110. ETL tool 400 parses the retrieved job output file to determine the return code associated with the completion status of the job. ETL tool 400 determines based, at least in part, on the return code and the retrieved return code threshold, whether the job stream continues to the next job. In the illustrative embodiment of FIG. 3, if the return code is equal to or below the return code threshold, then ETL tool 400 triggers the next job in the job stream. If the return code from the job output is higher than the return code threshold for the job, then ETL tool 400 determines to abort execution of the job stream. An error message regarding the reason for aborting the job stream, including the job file name and the job return code, may be sent to the database administrator, or be included in an error log.

Data warehouse application 300 performs job 2 to extract, transform, and load data from table B to table C (step 306). Table B and table C are tables within data target 124. The details of the ETL task were configured by the user using application development program 200, as shown in FIG. 2. In one embodiment, during development of data warehouse application 300 using application development program 200, a selection was made indicating that data target 124 is on a mainframe operating system. In one embodiment, ETL tool 400 may build the JCL code for job 2 dynamically during execution of data warehouse application 300. In an alternate embodiment, ETL tool 400 may retrieve previously written and stored JCL code for job 2 from library 122 on mainframe computer 106. In both embodiments, ETL tool 400 submits the job via FTP to job reader 120 on mainframe computer 106.

ETL tool 400 retrieves the wait time and return code threshold for job 2 from job rule store 126. After waiting the wait time associated with job 2, ETL tool 400 retrieves the job output file from the job log of output 128, parses the retrieved job output file to determine the return code, and determines whether the job stream continues to the next job as detailed above.

Data warehouse application 300 performs job 3 to extract, transform, and load data from table D to table E (step 308). Table D is a table within data target 124 residing on mainframe computer 106, and table E is a table within data source 114 residing on server computer 104. In the illustrated example, data is extracted from table D on mainframe computer 106, transformed, and then loaded onto table E on server computer 104. This is the reverse of job 1 where data flows from server computer 104 to mainframe computer 106. During development of data warehouse application 300 using application development program 200, selections were made indicating that data source 114 is on a non-mainframe operating system, and data target 124 is on a mainframe operating system. While data is to be loaded onto a non-mainframe operating system, data warehouse application 300 still needs integration by ETL tool 400 to extract the data from a database on a mainframe operating system.

ETL tool 400 retrieves the wait time and return code threshold for job 3 from job rule store 126. After waiting the wait time associated with job 3, ETL tool 400 retrieves the job output file from the job log, parses the retrieved job output file to determine the return code, and determines whether the job stream continues to the next job as detailed above.

Data warehouse application 300 performs job 4 to run report F (step 310). In the illustrative embodiment, job 4 may be a stored job from library 122 on mainframe computer 106. In this example, job 4 may access data target 124 only, and data warehouse application 300 requires that ETL tool 400 enable submitting job 4 remotely to mainframe computer 106 running mainframe OS 116. An FTP "get" command copies a file from a remote machine, such as mainframe computer 106, to a local machine, such as server computer 102. An FTP "put" command copies a file from a local machine, such as server computer 102, to a remote machine, such as mainframe computer 106. In one embodiment, ETL tool 400 may use an FTP "get" command to copy the job file from library 122 on mainframe computer 106 to server computer 102, and then use an FTP "put" command to copy the file from server computer 102 to job reader 120 on mainframe computer 106. In another embodiment, ETL tool 400 may use FTP to transfer the job file from library 122 directly to job reader 120. Job reader 120 submits the job file to job scheduler 118, which triggers the job to start. In yet another embodiment, ETL tool 400 may use FTP to transfer the job file directly to job scheduler 118, bypassing job reader 120, depending on the capability of the operating system. Data warehouse application 300 may retrieve and format data into a specialized report, e.g., report F, based on the updated tables in data target 124.

ETL tool 400 retrieves the wait time and return code threshold for job 4 from job rule store 126. After waiting the wait time associated with job 4, ETL tool 400 retrieves the job output file from the job log of output 128, parses the retrieved job output file to determine the return code, and determines whether the job stream continues on as detailed above.

Data warehouse application 300 performs job 5 to extract, transform, and load data from table F to table G (step 312). Table F and table G are tables within data source 114. The details of the ETL task were configured by the user using application development program 200, as shown in FIG. 2. During development of data warehouse application 300 using application development program 200, a selection was made indicating that data source 114 is on a non-mainframe operating system. The inclusion of a non-mainframe operating system job creates a mixed job stream. Embodiments provide an ETL tool 400 capable of processing a mixed job stream.

ETL tool 400 processes job 5 using methods known in the art for non-mainframe operating systems. ETL tool 400 receives a job return code from the database management system of data source 114, and determines whether the job stream continues to the next job in the job stream. At this point, all jobs of the illustrated job stream have completed and processing ends.

Figure 4:
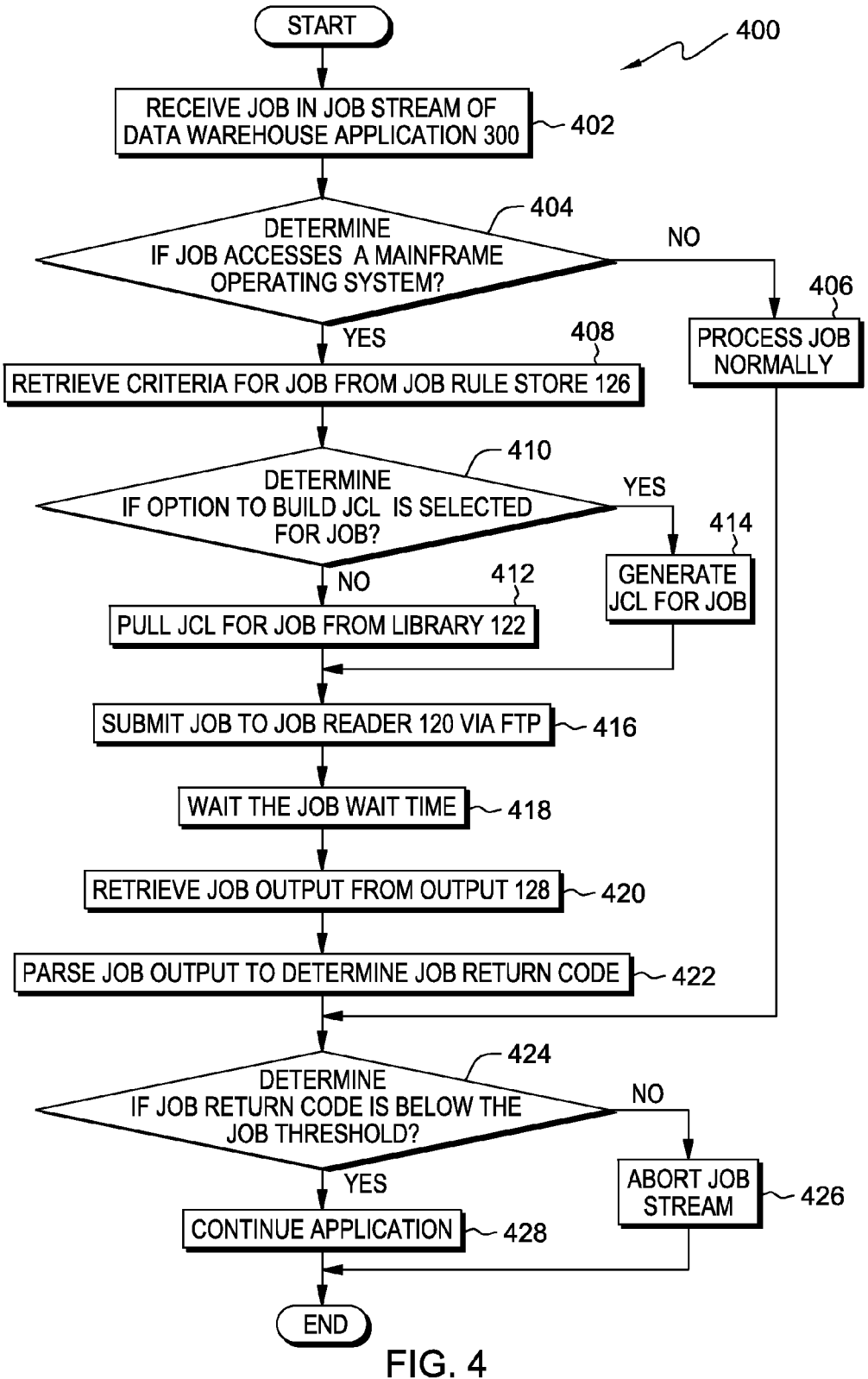
FIG. 4 is a flowchart depicting the operational steps of an ETL tool for the purpose of determining and executing remote job submission, in accordance with an embodiment of the present invention.

FIG. 4 is a flowchart depicting the operational steps of ETL tool 400 for the purpose of determining and executing remote job submission, in accordance with an embodiment of the present invention. In the illustrative embodiment, data warehouse application 300 comprises a job stream that includes at least one ETL job moving and transforming data from data source 114 on server computer 104 to data target 124 on mainframe computer 106. Other jobs of the job stream may move data from data target 124 on mainframe computer 106 to data source 114 on server computer 104. Other jobs of the job stream may request tasks utilizing only one of the databases. A job stream of jobs accessing different combinations of operating systems may be referred to as a mixed job stream. In accordance with embodiments of the present invention, ETL tool 400 is an integrated part of data warehouse application 300 and provides the database connections, and programming interface to perform the jobs of the job stream on both mainframe operating systems and non-mainframe operating systems.

ETL tool 400 receives a first job in the job stream of data warehouse application 300 (step 402). Data warehouse application 300 executes on server computer 102, which is a non-mainframe operating system. As an integrated component of data warehouse application 300, ETL tool 400 receives a first job in the job stream. In an embodiment, prior to processing the first job, the credentials of the application userid are submitted to and validated by the database management systems of both data source 114 and data target 124 to have authority for database reading and writing. If the userids do not have the authority for database reading and writing, then data warehouse application 300 aborts. In some embodiments, this validation is done at each data loading step of an ETL task rather than at the start of a job stream.

ETL tool 400 determines if a job accesses a mainframe operating system (decision block 404). The ETL code attached to data warehouse application 300 includes the information which can be used to determine if the job accesses a mainframe operating system for at least one data source or data target. During development of data warehouse application 300 using application development program 200, selections for each data source and data target may have taken the form of checkboxes, or highlights in drop-down menus. In one embodiment, application development program 200 may have divided the operating system selections between categories for mainframe operating systems, and non-mainframe operating systems. In another embodiment, application development program 200 may have requested the user to select the specific operating system. During runtime, these selections have been translated into code within data warehouse application 300. From the ETL code, ETL tool 400 determines which selections were made during development. The code may only contain the selected option with the appropriate criteria to perform the job.

If ETL tool 400 determines that a job does not access a mainframe operating system (no branch, decision block 404), then ETL tool 400 processes the job normally (step 406), using methods known in the art without having to use FTP or JCL code. After the job completes, ETL tool 400 determines if the job return code is below the job threshold (decision block 424) as detailed below.

If ETL tool 400 determines that a job accesses a mainframe operating system (yes branch, decision block 404), then ETL tool 400 retrieves criteria for the job from job rule store 126 (step 408). After determining the mainframe operating system option is selected for at least one of data source 114 or data target 124, the purpose of the remaining flowchart is for ETL tool 400 to enable formatting the job for remote submission to a mainframe operating system during the current application. ETL tool 400 retrieves criteria for the current job from job rule store 126, such as, the target computer operating system type, a host IP address or DNS server name related to the mainframe computer, a userid and password for the mainframe computer, a userid and password for the FTP server, an output class for job results, an output wait time, a return code threshold, a job file location, and a job file name.

ETL tool 400 determines if the option to build JCL is selected for the current job (decision block 410). Every job of the job stream of data warehouse application 300 which accesses a mainframe operating system is written in a batch processing script or job control language (JCL) readable by the mainframe operating system, such as mainframe OS 116. During development of data warehouse application 300 using application development program 200, a selection to build the JCL was made by the developer. The ETL code attached to data warehouse application 300 includes the information which can be used to determine if the option to build the JCL was selected. Some jobs are pre-written in JCL code and stored in library 122 on the mainframe computer, and do not need to be dynamically written in JCL by ETL tool 400. In that case, the option to build JCL would not be selected. In another example, the pre-written code may be stored on server computer 102 within ETL tool 400.

If ETL tool 400 determines that the option to build JCL is not selected for the job (no branch, decision block 410), then ETL tool 400 pulls or retrieves JCL code for the job from library 122 (step 412). In the case where the option to build JCL is not selected, ETL tool 400 retrieves previously written and stored JCL code. ETL tool 400 uses criteria, such as a userid and password for the FTP server, a job file location and a job file name, previously retrieved from job rule store 126 (in step 408) to retrieve a stored job or file containing JCL code from a location, such as library 122 on mainframe computer 106. ETL tool 400 authenticates with the FTP server on mainframe computer 106, and then ETL tool 400 issues an FTP "get" command to retrieve the job file from the specified location, i.e., library 122.

If ETL tool 400 determines that the option to build JCL is selected for the job (yes branch, decision block 410), then ETL tool 400 generates JCL code for the job (step 414). In one embodiment, ETL tool 400 builds the job file dynamically in JCL code or some other batch processing script, utilizing parameters stored in job rule store 126.

In an alternate embodiment, application development program 200 may generate the JCL code for the job when data warehouse application 300 is initially developed, and the JCL code may be saved as a stored job on either mainframe computer 106 in library 122, within ETL tool 400 on server computer 102, or some other location in communication with network 110. In that case, steps 410 and 414 would be unnecessary, as all JCL code would already exist, and step 412 would be performed every time.

ETL tool 400 submits the job to job reader 120 via FTP (step 416). At this point, the job file may have been modified to include JCL code. ETL tool 400 issues an FTP "put" command to send the job file to job reader 120. Subsequently, job reader 120 submits the job file to job scheduler 118, which triggers the job to start.

ETL tool 400 waits the job wait time (step 418). In one embodiment, ETL tool 400 uses criteria, such as, the wait time for a job or an operating system type, previously retrieved from job rule store 126 (in step 408) to determine how long to wait for the job to complete execution. In other embodiments, ETL tool 400 may receive a message from the system indicating when the job is completed. One skilled in the art will recognize that there may be other ways to determine when a job is completed.

ETL tool 400 retrieves the job output from output 128 (step 420). ETL tool 400 uses criteria, such as, an output class for job results, previously retrieved from job rule store 126 (in step 408) to locate the type and location of output results for the current job. After waiting the wait time associated with the current job (in step 418), ETL tool 400 retrieves the job output file from the job log, such as from a hold queue of output 128 on mainframe computer 106 via network 110. In one embodiment, ETL tool 400 issues an FTP "get" command to retrieve the job output file. One skilled in the art will recognize that there may be other ways to retrieve the job output file or results.

ETL tool 400 parses the job output to determine the job return code (step 422). ETL tool 400 uses criteria, such as, the return code threshold for a job or an operating system type, previously retrieved from job rule store 126 (in step 408) to determine the completion status of a job. ETL tool 400 parses the retrieved job output file into components to determine the return code associated with the completion status of the job.

ETL tool 400 determines if the job return code is below the job return code threshold (decision block 424). ETL tool 400 determines based, at least in part, on the return code and the retrieved return code threshold, whether the job stream continues to the next job or task. If the return code is less than the return code threshold, then ETL tool 400 triggers the next job in the job stream. In an example, a return code may be a two-digit code, such as 00, 04, 08, etc. In our example, a return code of 00 means the job completed without any errors. A return code of 04 means the job completed with a warning. A return code of 08 means the job failed before completion or had an abnormal ending ("abend"). If the return code threshold for the current job is 07, and the return code from the parsed output file is 04, then ETL tool 400 continues to the next job. In other embodiments, the threshold value may be a minimum instead of a maximum depending on the return code definitions for the operating system.

If ETL tool 400 determines that the job return code is not below the job return code threshold value (no branch, decision block 424), then ETL tool 400 aborts the job stream (step 426). By comparing the job return code to the job threshold value, ETL tool 400 determines if the job stream continues or aborts. If the return code from the job output is greater than or equal to the job threshold value, then ETL tool 400 determines to abort execution of the job stream. An error message regarding the reason for aborting the job stream, including the job file name and the job return code, may be sent to the database administrator, or be included in an error log. A determination at this point is helpful when the next job in the job stream is dependent on the results of the previous job.

If ETL tool 400 determines that the job return code is below the job return code threshold value (yes branch, decision block 424), then ETL tool 400 continues to the next job in the job stream of data warehouse application 300 (step 428), and no further processing is required by ETL tool 400 for the current job in the job stream.

Figure 5:
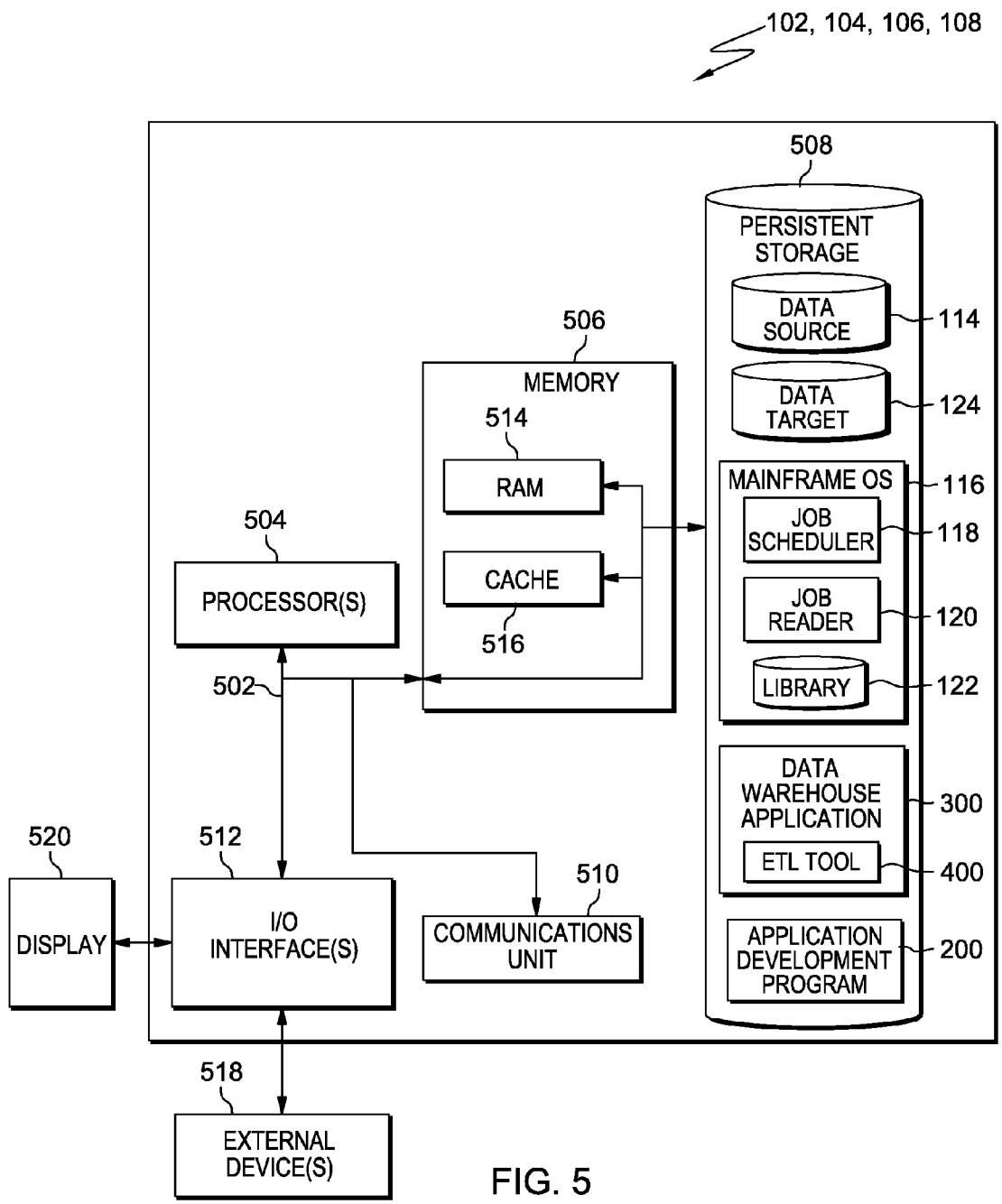
FIG. 5 depicts a block diagram of respective components of a computer system, in accordance with an illustrative embodiment of the present invention.

FIG. 5 depicts a block diagram of respective components of server computers 102 and 104, mainframe computer 106, and client computer 108, in accordance with an illustrative embodiment of the present invention. It may be appreciated that FIG. 5 provides only an illustration of one implementation and does not imply any limitations with regard to the environments in which different embodiments may be implemented. Many modifications to the depicted environment may be made.

Server computers 102 and 104, mainframe computer 106, and client computer 108, each include respective communications fabric 502, which provides communications between computer processor(s) 504, memory 506, persistent storage unit 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Data warehouse application 300, ETL tool 400, data source 114, data target 124, mainframe OS 116, job scheduler 118, job reader 120, library 122, and application development program 200 are stored in respective persistent storage 508 for execution and/or access by one or more of the further respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of server computers 102 and 104, mainframe computer 106, and client computer 108. In these examples, communications unit 510 includes one or more network interface cards. Communications unit 510 may provide communications through the use of either or both physical and wireless communications links. Data warehouse application 300, ETL tool 400, data source 114, data target 124, mainframe OS 116, job scheduler 118, job reader 120, library 122, and application development program 200 may be downloaded to respective persistent storage 508 through communications unit 510.

I/O interface(s) 512 allows for input and output of data with other devices that may be connected to server computers 102 and 104, mainframe computer 106, and client computer 108. For example, I/O interface 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., data warehouse application 300, ETL tool 400, data source 114, data target 124, mainframe OS 116, job scheduler 118, job reader 120, library 122, and application development program 200, can be stored on such portable computer readable storage media and can be loaded onto respective persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for remote job submission, the method comprising:
    responsive to a computer determining that a first job of an extract, transform, load (ETL) job stream accesses a mainframe operating system, the computer retrieving at least a return code threshold for the first job from a data store;
    responsive to determining that an option to build job control language is selected for the first job, the computer generating job control language for the first job;
    the computer submitting the first job to a job reader on the mainframe operating system using a file transfer protocol, wherein a job reader receives the first job via file transfer protocol (FTP), and submits the received first job to a job scheduler for execution;
    responsive to the computer parsing a retrieved output file of job results, the computer determining a return code for the first job based, at least in part on, the parsed retrieved output file of job results;
    the computer receiving the first job including a selection of a job type;
    responsive to determining that the job type of the first job is an ETL job type, the computer receiving a selection of at least one data source, and one or more data transformation rules;
    the computer receiving a selection of at least one data target;
    responsive to determining that the mainframe operating system is selected for the at least one data source, or the at least one data target, or both, the computer receiving one or more job parameters comprising at least the return code threshold for the first job;
    the computer storing the one or more job parameters for the first job in the data store; and
    the computer inserting the first job into the job stream.

2. The method of claim 1, further comprising:
    the computer comparing the return code for the first job to the return code threshold for the first job;
    the computer determining if the job stream continues based, at least in part, on the comparison; and
    if not, the computer transmitting an error message and aborting the job stream.

3. The method of claim 1, wherein responsive to determining that the option to build job control language is selected for the first job, the computer generating job control language for the first job comprises:
responsive to determining that the option to build job control language is not selected for the first job, the computer retrieving job control language for the first job from a library in the mainframe operating system, wherein the library comprises job control language for a plurality of jobs including the first job.

4. The method of claim 1, wherein the computer generating job control language for the first job comprises:
the computer generating job control language for the first job utilizing parameters stored in the data store including one or more of: an output class for job results, an output wait time, the return code threshold, a job file location, and a job file name.

5. The method of claim 1, further comprising:
the computer receiving at least one of the one or more job parameters further comprising the option to build job control language for the first job.

6. The method of claim 1, wherein the data store comprises:
parameters for remote job submission, including one or more of: a target computer operating system type, a host internet protocol (IP) address or domain name system (DNS) server name, a user identifier and password for the mainframe operating system, a user identifier and password for an FTP server, an output class for job results, an output wait time, the return code threshold, a job file location, and a job file name;
parameters for database access for one or more of the at least one data source, and the at least one data target; and
parameters organized by one of: job file name for each job of the job stream, and an operating system type.

7. A computer program product for remote job submission, the computer program product comprising:
a computer readable storage medium and program instructions stored on the computer readable storage medium, the program instructions comprising:
program instructions to retrieve at least a return code threshold for a first job from a data store, in response to determining that the first job of an extract, transform, load (ETL) job stream accesses a mainframe operating system;
program instructions to generate job control language for the first job, in response to determining that an option to build job control language is selected for the first job;
program instructions to submit the first job to a job reader on the mainframe operating system using a file transfer protocol, wherein a job reader receives the first job via file transfer protocol (FTP), and submits the received first job to a job scheduler for execution;
program instructions to determine a return code for the first job based, at least in part on, a parsed retrieved output file of job results, in response to parsing the retrieved output file of job results;
program instructions to receive the first job including a selection of a job type;
program instructions to receive a selection of at least one data source, and one or more data transformation rules, in response to determining that the job type of the first job is an ETL job type;
program instructions to receive a selection of at least one data target;
program instructions to receive one or more job parameters comprising at least the return code threshold for the first job, in response to determining that the mainframe operating system is selected for the at least one data source, or the at least one data target, or both;
program instructions to store the one or more job parameters for the first job in the data store; and
program instructions to insert the first job into the job stream.

8. The computer program product of claim 7, further comprising:
program instructions to compare the return code for the first job to the return code threshold for the first job;
program instructions to determine if the job stream continues based, at least in part, on the comparison; and
if not, program instructions to transmit an error message and abort the job stream.

9. The computer program product of claim 7, wherein program instructions to generate job control language for the first job, in response to determining that an option to build job control language is selected for the first job comprises:
program instructions to retrieve job control language for the first job from a library in the mainframe operating system, wherein the library comprises job control language for a plurality of jobs including the first job, in response to determining that the option to build job control language is not selected for the first job.

10. The computer program product of claim 7, wherein program instructions to generate job control language for the first job comprises:
program instructions to generate job control language for the first job utilizing parameters stored in the data store including one or more of: an output class for job results, an output wait time, the return code threshold, a job file location, and a job file name.

11. The computer program product of claim 7, further comprising:
program instructions to receive at least one of the one or more job parameters further comprising the option to build job control language for the first job.

12. The computer program product of claim 7, wherein the data store comprises:
parameters for remote job submission, including one or more of: a target computer operating system type, a host internet protocol (IP) address or domain name system (DNS) server name, a user identifier and password for the mainframe operating system, a user identifier and password for an FTP server, an output class for job results, an output wait time, the return code threshold, a job file location, and a job file name;
parameters for database access for one or more of the at least one data source, and the at least one data target; and
parameters organized by one of: job file name for each job of the job stream, and an operating system type.

13. A computer system for remote job submission, the computer system comprising:
one or more computer processors;
one or more computer readable storage media;
program instructions stored on the computer readable storage media for execution by at least one of the one or more processors, the program instructions comprising:
program instructions to retrieve at least a return code threshold for a first job from a data store, in response to determining that the first job of an extract, transform, load (ETL) job stream accesses a mainframe operating system;
program instructions to generate job control language for the first job, in response to determining that an option to build job control language is selected for the first job;
program instructions to submit the first job to a job reader on the mainframe operating system using a file transfer protocol, wherein a job reader receives the first job via file transfer protocol (FTP), and submits the received first job to a job scheduler for execution;
program instructions to determine a return code for the first job based, at least in part on, a parsed retrieved output file of job results, in response to parsing the retrieved output file of job results;
program instructions to receive the first job including a selection of a job type;
program instructions to receive a selection of at least one data source, and one or more data transformation rules, in response to determining that the job type of the first job is an ETL job type;
program instructions to receive a selection of at least one data target;
program instructions to receive one or more job parameters comprising at least the return code threshold for the first job, in response to determining that the mainframe operating system is selected for the at least one data source, or the at least one data target, or both;
program instructions to store the one or more job parameters for the first job in the data store; and
program instructions to insert the first job into the job stream.

14. The computer system of claim 13, further comprising:
program instructions to compare the return code for the first job to the return code threshold for the first job;
program instructions to determine if the job stream continues based, at least in part, on the comparison; and if not, program instructions to transmit an error message and abort the job stream.

15. The computer system of claim 13, wherein program instructions to generate job control language for the first job, in response to determining that an option to build job control language is selected for the first job comprises:
program instructions to retrieve job control language for the first job from a library in the mainframe operating system, wherein the library comprises job control language for a plurality of jobs including the first job, in response to determining that the option to build job control language is not selected for the first job.

16. The computer system of claim 13, wherein program instructions to generate job control language for the first job comprises:
program instructions to generate job control language for the first job utilizing parameters stored in the data store including one or more of: an output class for job results, an output wait time, the return code threshold, a job file location, and a job file name.

17. The computer system of claim 13, further comprising:
program instructions to receive at least one of the one or more job parameters further comprising the option to build job control language for the first job.

18. The computer system of claim 13, wherein the data store comprises:
parameters for remote job submission, including one or more of: a target computer operating system type, a host internet protocol (IP) address or domain name system (DNS) server name, a user identifier and password for the mainframe operating system, a user identifier and password for an FTP server, an output class for job results, an output wait time, the return code threshold, a job file location, and a job file name;
parameters for database access for one or more of the at least one data source, and the at least one data target; and
parameters organized by one of: job file name for each job of the job stream, and an operating system type.

* * * * *